Feb. 18, 1930.  C. A. JOHNSON  1,747,673
SWITCH BOX MOUNTING
Filed Oct. 17, 1925
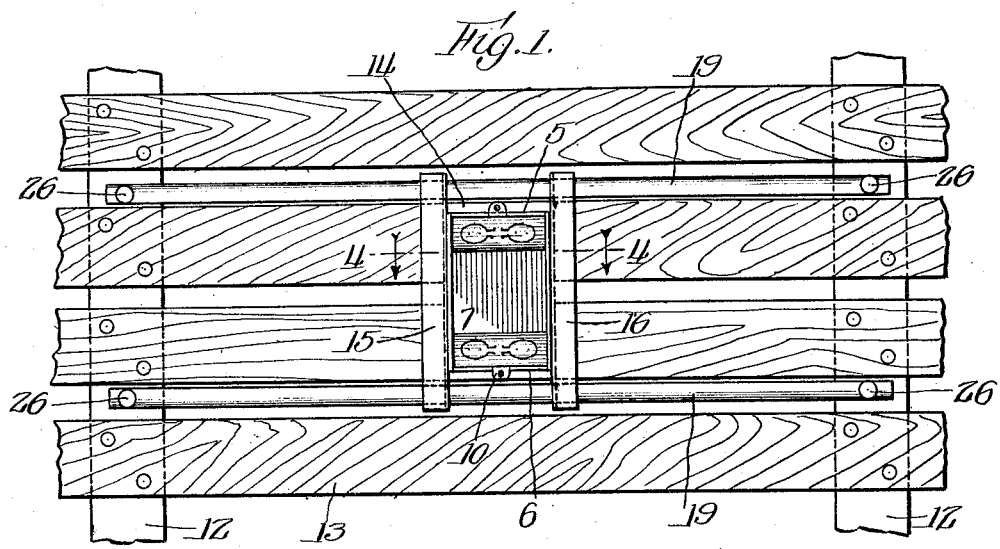
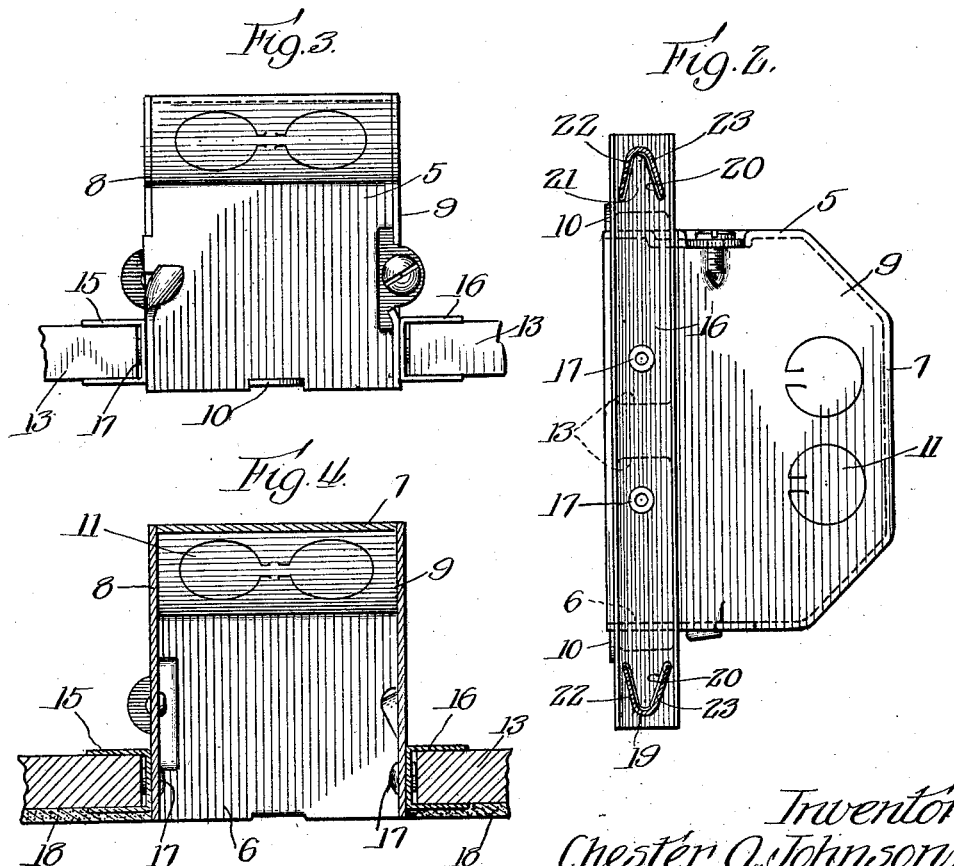
Inventor:
Chester A. Johnson, Patented Feb. 18, 1930

1,747,673

UNITED STATES PATENT OFFICE

CHESTER A. JOHNSON, OF CHICAGO, ILLINOIS, ASSIGNOR TO JEFFERSON ELECTRIC COMPANY, OF CHICAGO, ILLINOIS, A CORPORATION OF ILLINOIS

SWITCH-BOX MOUNTING

Application filed October 17, 1925. Serial No. 62,949.

The invention relates to improvements in switch boxes which are adapted to be mounted in a building wall and to contain an electric switch, and has particular reference to new and improved switch box mountings.

The switch box mounting comprises a pair of side strips secured to the sides and extending beyond the ends of the switch box. The ends of the strips are attached to a pair of parallel supporting bars between which the box is located. The primary object of the present invention is to provide novel means of engagement between the side strips and the supporting bars.

Another object of the invention is to provide a novel switch box mounting which is simple and sturdy in construction.

Further objects and advantages will become apparent as the description proceeds.

In the accompanying drawings, Figure 1 is a front view showing a structure embodying the features of my invention mounted in a fragment of a wall.

Fig. 2 is a side view of the switch box.

Fig. 3 is an upper end view of the switch box.

Fig. 4 is a sectional view taken along line 4—4 of Fig. 1, a portion of the plaster being shown.

While the invention is susceptible of various modifications and alternative constructions, I have shown in the drawings and will herein describe in detail the preferred embodiment, but it is to be understood that I do not thereby intend to limit the invention to the specific form disclosed, but aim in the appended claims to cover all modifications and alternative constructions falling within the spirit and scope of the invention.

Referring to the drawings, the switch box selected for illustration comprises a sheet of metal bent to form end walls 5, 6, and a rear wall 7, and removable side walls 8 and 9. The side walls permit "ganging" of the boxes, and the end walls are formed integral with lugs 10 to which the switch (not shown) is adapted to be attached. The usual knock-out plugs 11 are provided in the walls of the box and upon being removed will leave openings for the conduits.

The box is adapted to be mounted in different kinds of walls but particularly in a wall such as is shown in Fig. 1 consisting of uprights 12 and laths 13. A portion of the lath structure is cut away to provide an opening 14 in which the box is positioned, thereby leaving certain of the laths with free ends not attached to a supporting upright.

To support the box in position, channel shaped strips 15 and 16 are secured to the side walls 8 and 9 in any suitable manner as by means of rivets 17. The sides of the channels are adapted to fit across the front and rear sides of the free or cut ends of the laths terminating at the sides of the box to hold the laths rigid. The strips 15 and 16 are so positioned on the box that the open front end of the box projects a distance ahead of the lath surface substantially equal to the thickness of the plaster 18.

The strips 15 and 16 are extended beyond the ends of the box, and the extended ends are adjustably secured to two parallel bars 19 attached to the uprights 12. The strips and the bars are adapted to be yieldingly clamped in adjusted position when the box is located in the desired position. Each of the extended ends of the strips 15 and 16 is formed to present an abutment therein angular to the vertical. In the present instance there are two such abutments in each strip which are the edges of a V-shaped slot 20, the apex of which extends away from the end of the box. The slot 20 defines a tooth or tongue 21.

The bars 19 are constructed of flexible sheet metal such as steel, and in the present instance are bent longitudinally into a V-shape to form front and rear sides 22 and 23. The bars are adapted to extend loosely through the slots 20 to permit the box to be adjusted laterally into any desired position, each face of the bar being angular to the vertical plane when positioned in the slot 20.

The material of the bar is such that on nailing the bar to the studs, the two sides approach each other for a considerable distance away from the clamped portion. The recessed or slotted channel strips on the box are the only means to resist this mutual approach of the sides and in so far as they do this the box is held firmly by the bars binding upon the edges of the V-shape slot. The holding action is, of course, of greater binding force the nearer the box lies to a nailed end of the bar. However, another binding force holds the box, and this results from the torsional deformation of the bars 19.

Referring to Fig. 2 the bar 19 is shown with its front face 22 and its rear face 23 at an angle to the plane of the box opening, which is the vertical plane. When the bar is unnailed to the stud the rear bar face maintains this angle to the vertical along the entire length of the bar. However, upon nailing a bar to a stud the bar becomes twisted so that the ends of the rear face 23 move into a vertical plane along the face of the stud 12, the portion of the rear face at the box maintaining substantially the original angular relation. Thus, the rear face is twisted and the force of the twist binds the box and bar to prevent sliding. In the present embodiment of the bar the front face also twists but in the reverse direction. The twist in one face does not neutralize the twist in the other face because in nailing both sides of the bar to the stud, as is done in the present embodiment of the invention, the twist first occurs in the rear face and the front face is thereafter bent toward the rear face rather than each face being bent equally to the median plane of the bar as originally shaped. Thus, by using a V-shaped bar both the torsion and the clamping effects within the bar itself are utilized to bind the box against motion. The angular cross-section of the bar gives greater resistance to flexure and holds the box more firmly against motion in and out of the plane of the wall.

In installing the box, the bars 19 are extended through the slots 20 and are then loosely secured to the uprights 12 by nails 26. The box is adjusted to the desired position, and the nails 24 are tightened to clamp the sides 22 and 23 of the bars 19 into resilient engagement with the edges of the tongues 21 to lock the box in adjusted position. This switch box mounting is simple, inexpensive and sturdy in construction, and permits the box to be quickly and securely mounted in the wall.

I claim as my invention:

1. A switch box mounting having, in combination, a box, supporting members secured to the sides of said box and extending beyond the ends thereof, slots formed in the projecting ends of said members, and supporting bars arranged to extend loosely through said slots and capable of deformation to produce a frictional engagement with the edges of said slots.

2. A switch box mounting having, in combination, a box, supporting brackets secured to said box, said brackets being formed with slots, and parallel supporting means extending slidably through said slots, said means being capable of deformation in mounting so as to produce frictional engagement with said slots.

3. A switch box mounting having, in combination, a box, supporting brackets secured to the sides of said box and projecting beyond the ends thereof, said projecting ends having slots formed therein, and parallel supporting members extending slidably through said slots to support said box.

4. A switch box mounting having, in combination, a box, channel strips secured to the sides of said box and extending beyond the ends thereof, said extending ends having V-shaped slots formed therein and a pair of parallel V-shaped deformable bars extending slidably through said slots, said bars normally permitting said box to be adjusted longitudinally but each bar being capable of deformation to permit the sides thereof to be clamped together to produce a frictional engagement with the edges of said slots.

5. A switch box mounting having, in combination, a bar, an open faced box provided with a recess permitting relative sliding of the bar and box, said bar being so arranged that it normally extends through said recess and at opposite sides of the box presents faces disposed angularly to the plane of the opening of the box, said bar being of such material as to permit twisting thereof tending to bring the portions of said faces adjacent the box into the plane of the opening of the box whereby to bind the bar in the recess by the torsion in the bar, and means for holding said box against movement with the bar during the distortion of said bar.

6. A switch box mounting having, in combination, a pair of bars, a box provided with a pair of spaced recesses permitting relative sliding of the bars and box with the bars in parallel relation to each other, said bars having faces at an angle to each other, one of said bars being of deformable material to permit twisting thereof tending to bring the portions of said faces adjacent the box into the same plane whereby the torsion in said twisted bar binds the box at the recess engaging said bar to hold the box against sliding motion on said bars.

7. A switch box mounting having, in combination, a bar having normally a plane face and being cable of twisting, an open-faced box recessed to receive said bar with said face normally at an angle to the plane of the box opening, said bar being of deformable material to permit said bar on opposite sides of said box to be secured with said face in a plane parallel to the plane of the box opening to twist the bar and bind the box, and means preventing movement of the box while the bar is deformed.

8. A switch box mounting having, in combination, a box having an open face, means associated with the box providing a slot inclined to the plane of the box opening, a deformable bar adapted to enter said slot, the arrangement being such that the box is slidable and non-rotatable on the bar, and is capable of twisting to have portions lie in a plane parallel to the opening of the box, and means for holding said box to effect the deformation of said bar.

9. The method of securing a switch box in an adjustably fixed position between two studs which comprises associating a bar non-rotatably but slidably with said box, positioning the box between the studs, twisting the bar, and securing the twisted bar to a stud, whereby the torsion in the twisted bar binds the box against sliding.

10. The method of securing a switch box in an adjustably fixed position between two studs which comprises associating a bar non-rotatably but slidably with said box, positioning the box between the studs, holding the box against swinging movement about the bar, twisting the bar, and securing the twisted bar whereby the torsion in the twisted bar binds the box against sliding.

In testimony whereof, I have hereunto affixed my signature.

CHESTER A. JOHNSON.